3,317,540
MICROBIOCIDAL QUATERNARY AMMONIUM AROMATIC SULFONAMIDES
Reginald L. Wakeman, Philadelphia, Pa., and E. Griffin Shay, Belle Mead, N.J., assignors, by mesne assignments, to Millmaster Onyx Corporation, New York, N.Y., a corporation of New York
No Drawing. Filed July 30, 1964, Ser. No. 387,270
14 Claims. (Cl. 260—286)

The object of the present invention is the preparation of microbiologically active compounds by the reaction of certain quaternary ammonium hydroxides or salts with arylsulfonamides or their alkali-metal salts.

The products of this invention conform, in general, to the following structure:

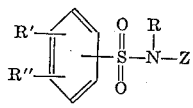

wherein Z is the cation of a microbiologically active quaternary ammonium compound; R may be hydrogen or a halogen, or an alkyl, cycloalkyl, aryl or aroyl radical; R' may be hydrogen or a halogen or a nitro radical or a phenyl or phenoxy radical; R" may be hydrogen or a halogen or a nitro radical or an alkyl radical; or R' and R" may form part of the same aromatic or alicyclic radical.

Typical examples of these arylsulfonamides are benzenesulfonamide, benzenesulfanilide, N-ethyl-benzenesulfonamide, N-cyclohexyl-benzenesulfonamide, N-dodecyl-benzenesulfonamide, N-benzoyl-benzenesulfonamide, toluenesulfonamide, N-chloro-toluenesulfonamide, ethylbenzenesulfonamide, dodecylbenzenesulfonamide, phenylbenzenesulfonamide, naphthalenesulfonamide, tetrahydronaphthalenesulfonamide, mono- or di-chloro- or bromobenzenesulfonamide, mono- or di-nitrobenzenesulfonamide, and the like.

Typical examples of the quaternary ammonium compounds which may be used in this invention are the alkyl trimethyl ammonium chlorides, alkyl-benzyl trimethyl ammonium chlorides, alkyl dimethyl benzyl ammonium chlorides, alkyl dimethyl menaphthyl ammonium chlorides, alkyl dimethyl substituted-benzyl ammonium chlorides in which the benzyl radical is substituted with one or more side chains containing from 1 to 5 carbon atoms such, for example, as methyl, dimethyl, ethyl and the like and in which the carbon atoms may be all in the same or different side chains or in which the benzyl radical bears one, two or more halogen atoms such as chlorine or bromine, alkyl pyridinium chlorides, alkyl isoquinolinium chlorides and bromides, alkyl lower-alkyl pyrrolidinium chlorides, alkyl lower-alkyl morpholinium chlorides in all of which the alkyl group may have from 8 to 22 carbon atoms and the lower-alkyl group may have from 1 to 4 carbon atoms and alkyl phenoxy ethoxy ethyl dimethyl benzyl ammonium chloride in which the alkyl radical may be iso-octyl or nonyl and in which the phenyl radical may, if desired, be substituted by a methyl radical. Various other analogs of these quaternaries may also be employed such, for example, as cetyl dimethyl ethyl ammonium bromide or oleyl dimethyl ethyl ammonium bromide.

In general, the quaternary ammonium compounds useful in this invention are the higher alkyl quaternary ammonium hydroxides, halides (chlorides and bromides), sulfates, methosulfates and the like possessing the following formula:

where R is an alkyl or alkaralkyl radical containing from 8 to 22 carbon atoms or an alkyl phenoxy ethoxy ethyl radical in which R is an alkyl radical containing from 8 to 9 carbon atoms and in which the phenyl radical may be substituted by a methyl group; R' and R" are methyl or ethyl radicals or members of a heterocyclic ring system such as pyridine, isoquinoline, pyrrolidine and morpholine; R"' is a methyl radical or a benzyl group or a substituted-benzyl group such, for example, as a monochlorobenzyl radical or a dichlorobenzyl radical or mixture thereof or a methyl benzyl, dimethyl benzyl, ethyl benzyl, diethyl benzyl, isopropyl benzyl, tertiary butyl benzyl or another benzyl radical containing from 1 to 5 carbon atoms as side chains, either as a single side chain or a multiplicity of side chains including mixtures thereof or a menaphthyl group or hydrogenated menaphthyl group. When R' and R" are members of a morpholine or pyrrolidine ring, R"' is a methyl, ethyl, propyl or butyl group. When R' and R" are members of an unsaturated heterocyclic ring such as pyridine or isoquinoline, R"' is the same radical as R". X in the above formula corresponds to a halide radical such as chloride, bromide or iodide or to any other water-soluble anion such as methosulfate.

In general, we prefer to use such quaternary ammonium compounds which have a phenol coefficient of at least 100 with respect to both Staphylococcus aureus and Salmonella typhosa at 20° C. when determined by the standard method given in the "Official Methods of Analysis of the Association of Official Agricultural Chemists," ninth edition (1960), page 63 et seq.

The compounds of this invention may be prepared by mixing aqueous solutions of the quaternary ammonium salts or hydroxides with the sulfonamide in question or any of its alkali-metal salts.

After thorough mixing, the organic product layer is separated from the aqueous layer (as with a separatory funnel) since two distinct phases are formed. Separation may be facilitated by the addition of an organic solvent immiscible with water. The product layer may be washed with water to remove any residual by-product salt or un-reacted materials. The solvent, if any, may be evaporated and the product air or vacuum dried to a paste, wax, oil or solid.

It is not necessary to use an aqueous medium. Any solvent or solvent mixture in which the starting materials are soluble will be satisfactory. Non-aqueous solvents facilitate the separation of by-product inorganic salt and reduce the need for vacuum drying to get an anhydrous product. When a non-aqueous medium is employed, it is usually necessary to add a small amount of water to facilitate ionic reaction.

The product may be used, if desired, without drying since any entrapped water is irrelevant to the microbiological activity of the compounds. In other applications, removal of water may be essential for reasons not related to biological activity.

An alternative method for the preparation of compounds especially applicable to the treatment of fabric, ropes, net, woven and non-woven fabric and reticulated or convoluted materials involves a two-step process. In the first step, the material is passed through a bath containing the anionic moiety. Excess solution is removed by methods well known to those skilled in the art. The treated material is then passed through a second bath wherein the concentration of quaternary ammonium compound is such that the material pickup will result in an equivalent amount of quaternary ammonium compound reacting with the anionic moiety, depositing the product in the most intimate way on the surface and in the interstices, convolutions and reticulations of the material.

The method of adjustment of solution concentration to achieve the required pickup is well known to those skilled in the art. The order of treatment may be reversed without affecting the biological activity or durability of the product on the material. The products of this invention may be formulated as water dispersions by dissolving them in a water miscible organic solvent such as acetone or methanol and diluting with water or by dissolving them in emulsifiable oils such, for example, as sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiological activity despite their relative insolubility in water. Because of their unusual combination of physical and microbiological properties, they can be used to impart laundry-resistant anti-microbial characteristics to textiles. They can also be used as the active agent in antimildew finishes for textiles which are resistant to leaching with water.

Although the compounds have low water solubility, they are compatible with various organic solvents, plasticizers and high molecular weight compounds. Consequently, they may be incorporated as anti-microbial agents in synthetic resins and plastics. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents. In such compositions they retain their microbiological activity.

It will be understood that the properties of the products described herein will vary depending upon the nature of the cationic quaternary ammonium compound used in their preparation as well as the anionic compound reacted therewith.

The chemical, physical and biological properties of the products of our invention make them especially appropriate for the following applications when suitably incorporated in active amounts in an appropriate vehicle, binder, medium or substrate:

(1) Mildewproofing fabric, canvas, ropes, textiles, awnings, sails, tenting and other woven and non-woven reticulated materials.
(2) Paint mildewstats.
(3) Jet plane fuel additive to control growth of microorganisms.
(4) Odor preservative agents for clothes and shoes.
(5) Mildew retardant and odor suppressant for shoes and other leather products.
(6) Topical antiseptics.
(7) Antidandruff agents.
(8) Disinfection agents for hair and gut of man and beast.
(9) Bacteriostatic furniture dressing.
(10) Surface finishes for stone, plaster, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage.
(17) Contact biostat for application to film, waxes and cloth to preserve cheese, meats and vegetables and other food products.
(18) Algal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.
(24) Preservation of metal-working compounds.
(25) Additives for soap and for both anionic and non-ionic detergents in liquid, bar, powder, bead, solution and other forms to impart bacteriostatic and fungistatic properties thereto.
(26) Bacteriostatic agents for household laundry softeners.
(27) Algastat and bacteriostat in recirculated water for cooling towers, air conditioners and humidifiers.
(28) Bacteriostat and algastat for flood waters and brines used in secondary oil recovery.
(29) Fungistat for seed and soil treatment against damping-off.

The microbiological activity of our compounds has been evaluated for microbiological stasis by the Standard Tube Dilution Test, the technique for which is common knowledge to those skilled in the art. A Difco Bacto CSMA Broth #0826 was used in the study. This test is used to determine the lowest concentration of microbiologically active compounds which will inhibit the growth of the organism in question. For a wide range of applications, the inhibition of growth rather than outright kill is satisfactory.

Briefly put, the Tube Dilution Test consists in placing 9 cc. of the CSMA broth in a test tube which is then sterilized in an autoclave. One cc. of a solution of the microbiologically active compound at an appropriate concentration is added to the test tube which is then inoculated with 0.1 cc. of a twenty-four hour old culture of the organism under study. The test tube is then incubated at 37° C. for forty-eight hours and observed for bacterial growth.

The same procedure is followed for fungi. In such tests, however, the tubes are incubated for fourteen days at a temperature suitable for optimum fungal growth, usually 25° C.

This invention is illustrated by, but not restricted to, the following examples:

*Example I*

A stock solution of the sodium salt of p-toluenesulfonamide was prepared at 6% concentration by weight. An aliquot of this solution containing 0.030 molecular weight of the material was agitated vigorously while adding a chemically equivalent amount of a 10% solution of a commercial grade of alkyl dimethyl ethyl-benzyl ammonium chloride (Onyx Chemical Corporation's "BTC–471" in which the alkyl distribution is 50% $C_{12}$, 30% $C_{14}$, 17% $C_{16}$, 3% $C_{18}$). A little benzene was added to facilitate phase separation and the mixture was transferred to a separatory funnel. The organic product layer was removed and dried in vacuo to yield the alkyl dimethyl ethyl-benzyl ammonium salt of p-toluenesulfonamide as a viscous yellow liquid in 89% of the theoretical yield.

Instead of toluenesulfonamide, benzenesulfonamide or benzenesulfanilide may be substituted to yield analogous products.

*Example II*

In the same manner, an aliquot of the solution of sodium p-toluenesulfonamide of Example I containing 0.030 mol of the salt was reacted with a chemically equivalent amount of a 10% solution of a commercial grade of alkyl dimethyl benzyl ammonium chloride (Onyx Chemical Corporation's "BTC–824" in which the alkyl distribution is 60% $C_{14}$, 30% $C_{16}$, 5% $C_{12}$, 5% $C_{18}$) in the presence of a little benzene. The organic product layer, separated and vacuum dried, yielded 95% of the theoretical amount of alkyl dimethyl benzyl ammonium salt of p-toluenesulfonamide.

Naphthlenesulfonamide or benzoyl-benzenesulfonamide may be substituted for p-toluenesulfonamide to yield analogous products.

Example III

In the same way, an aliquot of the solution of sodium p-toluenesulfonamide of Example I containing 0.030 molecular weight of the salt was reacted with a chemically equivalent amount of a 10% solution of a commercial grade of alkyl isoquinolinium bromide (Onyx Chemical Corporation's "Isothan Q-75" in which the alkyl distribution is 50% $C_{12}$, 30% $C_{14}$, 17% $C_{16}$, 3% $C_{18}$). The separated and vacuum dried product, alkyl isoquinolinium salt of p-toluenesulfonamide, was recovered in the theoretical yield as a viscous red-brown liquid.

Example IV

A 10% aqueous stock solution was prepared from a commercial grade of chloramine-T (the sodium salt of N-chloro-p-toluenesulfonamide). An aliquot of this solution containing 0.066 molecular weight was reacted with a chemically equivalent amount of the solution of alkyl dimethyl ethyl-benzyl ammonium chloride of, and in the same manner as in Example I. Alkyl dimethyl ethyl-benzyl ammonium salt of N-chloro-p-toluenesulfonamide was obtained in 93% of the theoretical yield as a yellow paste.

When tested by the Standard Tube Dilution Test described above, this product gave the following values for static dilution:

| | |
|---|---|
| Staphylococcus aureus | $10^{-7}$ |
| Salmonella typhosa | $>10^{-7}$ |
| Aspergillus niger | $10^{-5}$ |

Example V

In the same manner, an aliquot of the solution of chloramine-T of Example IV containing 0.066 molecular weight of the salt was reacted with a chemically equivalent amount of the solution of alkyl dimethyl benzyl ammonium chloride of Example II. The alkyl dimethyl benzyl ammonium salt of N-chloro-p-toluenesulfonamide was recovered in 100% of the theoretical yield as a yellow paste.

When tested by the Standard Tube Dilution Test described above, this product gave the following values for static dilution:

| | |
|---|---|
| Staphylococcus aureus | $10^{-7}$ |
| Salmonella typhosa | $10^{-6}$ |
| Aspergillus niger | $10^{-5}$ |

Example VI

An aliquot of the stock solution of chloramine-T of Example IV containing 0.066 molecular weight of the compound was reacted with a chemically equivalent amount of the solution of alkyl isoquinolinium bromide of Example III and in the same manner. Alkyl isoquinolinium salt of N-chloro-p-toluenesulfonamide was recovered in 90% of the theoretical yield as a brown paste.

When tested by the Standard Tube Dilution Test described above, this product gave the following values for static dilution:

| | |
|---|---|
| Staphylococcus aureus | $10^{-5}$ |
| Salmonella typhosa | $10^{-5}$ |
| Aspergillus niger | $10^{-5}$ |

Example VII

A solution of the sodium salt of dodecylbenzenesulfonamide was reacted stoichiometrically with the solution of the alkyl dimethyl ethyl-benzyl ammonium chloride of Example I and in the same manner. The product, alkyl dimethyl ethyl-benzyl ammonium salt of dodecylbenzenesulfonamide, was obtained in the theoretical yield.

Example VIII

An aliquot of the solution of sodium salt of dodecylbenzenesulfonamide of Example VII was reacted in stoichiometric proportions with the solution of alkyl dimethyl benzyl ammonium chloride of Example II and in the same manner. Alkyl dimethyl benzyl ammonium salt of dodecylbenzenesulfonamide was recovered in substantially the theoretical yield.

Example IX

An aliquot of the solution of sodium salt of dodecylbenzenesulfonamide of Example VII was reacted stoichiometrically with the solution of alkyl isoquinolinium bromide of Example III and in the same manner. Substantially the theoretical yield was obtained of alkyl isoquinolinium salt of dodecylbenzenesulfonamide.

Example X

A 25% solution of each of the compounds from Examples I–III and VII–IX was prepared in butyl Cellosolve (ethylene glycol monobutyl ether). Four parts of each of these solutions was mixed with 96 parts of a commercial grade of an oil-base paint containing no other fungicide.

Strips of filter paper cut to 1″ by 4″ were coated with this paint and allowed to dry. They were then inoculated with a culture of *Pullularia pullulans* and held in an incubator at 25° C. and 90% relative humidity for three weeks. At the end of this time, no fungus growth was visible.

Example XI

Mixtures were made containing 4 parts of each of the 25% solutions in butyl Cellosolve of Example X in 96 parts of a commercial latex-base paint containing 30% of polyvinyl chloride in emulsion and containing no other fungicide.

Strips of filter paper were coated with this paint and allowed to dry. They were inoculated with a culture of *Pullularia pullulans* and incubated as in Example X for three weeks. At the end of this time, no fungus growth was visible on any of the strips.

We claim:

1. An antimicrobial compound having the formula:

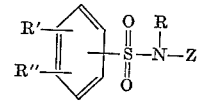

wherein Z is a quaternary ammonium cation having a phenol coefficient of at least 100 with respect to both *Staphylococcus aureus* and *Salmonella typhosa* at 20° C., R is a member of the group consisting of hydrogen, halogen, alkyl, cycloalkyl, aryl and aroyl groups, R' is a member of the group consisting of hydrogen, halogen, nitro, phenyl and phenoxy groups, and R" is a member of the group consisting of hydrogen, halogen, nitro and alkyl groups, R' and R" being selectively separate or part of a common ring system selected from the group consisting of aromatic and alicyclic ring systems.

2. Alkyl dimethyl ethyl-benzyl ammonium salt of p-toluenesulfonamide.

3. Alkyl dimethyl ethyl-benzyl ammonium salt of benzenesulfonamide.

4. Alkyl dimethyl ethyl-benzyl ammonium salt of benzenesulfanilide.

5. Alkyl dimethyl benzyl ammonium salt of p-toluenesulfonamide.

6. Alkyl dimethyl benzyl ammonium salt of naphthalenesulfonamide.

7. Alkyl dimethyl benzyl ammonium salt of benzoylbenzenesulfonamide.

8. Alkyl isoquinolinium salt of p-toluenesulfonamide.

9. Alkyl dimethyl ethyl-benzyl ammonium salt of N-chloro-p-toluene-sulfonamide.

10. Alkyl dimethyl benzyl ammonium salt of N-chloro-p-toluene-sulfonamide.

11. Alkyl isoquinolinium salt of N-chloro-p-toluene-sulfonamide.

12. Alkyl dimethyl ethyl-benzyl ammonium salt of dodecylbenzenesulfonamide.

13. Alkyl dimethyl benzyl ammonium salt of dodecylbenzenesulfonamide.

14. Alkyl isoquinolinium salt of dodecylbenzenesulfonamide.

References Cited by the Examiner

UNITED STATES PATENTS 2,899,424   8/1959   Rudner _____ 260—286 X

OTHER REFERENCES

Merck Index, 7th ed., Merck, 1960, pp. 134, 222, 234, 343 and 995.

Reddish: "Antiseptics, Disinfectants, Fungicides and Chemical and Physical Sterilization," Lea & Feringer, 1954, p. 505.

Schwartz: Surface Active Agents and Detergents, vol. II, Interscience, 1958, p. 222.

ALEX MAZEL, *Primary Examiner.*

NICHOLAS S. RIZZO, HENRY R. JILES, *Examiners.*

DONALD D. DAUS, *Assistant Examiner.*